Patented May 31, 1938

2,119,240

UNITED STATES PATENT OFFICE 2,119,240

METHOD OF INHIBITING GUM FORMATION IN STORED HYDROCARBON MOTOR FUELS

Willard E. Lyons, Chicago, Ill., assignor to Hendricks Research Corporation, Chicago, Ill., a corporation of Illinois No Drawing. Application December 10, 1937, Serial No. 179,101

7 Claims. (Cl. 44—9)

This invention relates to a method of inhibiting the formation of gum in liquid hydrocarbons, such as motor fuels, during storage.

It has heretofore been proposed to prevent the formation of gum in gasolines and other motor fuels by dissolving therein an inhibitor or anti-oxidant, as for instance benzyl para amino phenol. The patent to Roberts No. 2,050,732, dated August 11, 1936, discloses the use of a chemically treated water layer in storing gasoline containing a dissolved inhibitor of this type. According to that patent, color changes in the inhibited gasoline, due to the presence of water which is neutral or which has an alkaline reaction, may be prevented by acidifying the water layer. Table 1 of the Roberts specification specifically shows that, (a) if no gum inhibitor, such as an amino phenol, is present in the gasoline, there is no color change, even though an untreated water be present; and (b) that the presence of a gum inhibitor in the gasoline, such as an amino phenol, does not cause a color change unless water is present. The Roberts patent thus shows that there is no utility in chemically treating a water layer unless an amino phenol type of gum inhibitor is present in the gasoline.

I have now found, however, that the formation of gum in uninhibited liquid hydrocarbons, motor fuels and the like, can be prevented by storing such liquid hydrocarbons in contact with a surface of a non-miscible phase containing dissolved water soluble acid reacting compounds. Said non-miscible liquid phase may take the form of a layer of water, glycerine, a water soluble glycol, or the like containing dissolved therein a water soluble acidifying agent. In probably its most practical form, my invention contemplates establishing at the bottom of the storage tank a layer of water having an acidifying agent dissolved therein. It is within the scope of the present invention, however, to provide at any point beneath the surface of the stored liquid hydrocarbons a layer or mass of a non-miscible phase, at the interface of which free hydrogen ions are available for contact with the liquid hydrocarbons.

The present invention thus concerns itself with a method of storing uninhibited liquid hydrocarbons, particularly motor fuels, such as gasolines obtained by any of the usual processes of distillation, cracking, or polymerization, aromatic hydrocarbons, such as benzol, or blended fuels containing any of these, in such a way as to prevent the formation of gum in the liquid hydrocarbons during storage. The term "uninhibited", as used herein in referring to liquid hydrocarbons, motor fuels and the like, signifies that no inhibitor or anti-oxidant, such for example as an amino phenol, has been dissolved in the liquid hydrocarbon, or, if so dissolved therein, the concentration thereof is so small as to be ineffective, or to become ineffective during a period of storage in excess of the period of storage for which such small concentration was intended.

The exact mechanism of gum formation in liquid hydrocarbon motor fuels is not understood, but authorities seem to agree that the initial step in gum formation consists in the addition of oxygen, taken from the air, at the double bonds of the unsaturated organic compounds present in the fuel, forming so-called "peroxides". The "peroxides" in some way then undergo further reaction or polymerization to form a gum-like substance. The initial period during which no, or practically no absorption of oxygen by the gasoline takes place, is called the induction period. At the end of this period oxygen is absorbed at a definite rate for the given gasoline, the rate being independent of the length of the induction period. The process that takes place after the induction period is spoken of as autoxidation, the belief being that the products formed in the gasoline due to oxygen absorption themselves catalyze further oxidation reaction.

It was not known heretofore, so far as I am aware, that the formation of gum in gasoline could be inhibited otherwise than by actually dissolving in the gasoline an inhibitor or anti-oxidant. It was, therefore, entirely unobvious that a comparable degree of inhibiting effect could be produced by the method of my present invention. By way of explanation, but in no wise as a limitation upon the scope of my invention, I believe that the gum inhibiting effect realized through the use of my method is due to catalytic activity in a heterogeneous system, resulting in the destruction of "peroxides" at the interface between the non-miscible phases. It seems probable that the free hydrogen ions at the interface are responsible for the destruction of "peroxides", whereby the chain of reaction leading to the ultimate formation of gum is interrupted. That a catalytic activity is involved is indicated by the fact that there appears to be no diminution in the inhibiting effect during continued use of the non-miscible phase with fresh quantities of uninhibited gasoline.

It is thus possible, in accordance with my present invention, to effectively inhibit the formation of gum in uninhibited gasoline by the use of a non-gasoline soluble acidifying agent that is not appreciably destroyed or used up over prolonged periods of storage, and that is not consumed in the consumption of the gasoline withdrawn from storage. The economic advantages of my method of inhibiting gum formation over the use of gasoline soluble inhibitors or anti-oxidants are thus evident.

It is therefore an important object of this invention to provide a method of inhibiting the formation of gum in liquid hydrocarbons, motor fuels and the like, without the use of dissolved inhibitors or anti-oxidants, by providing a non-miscible phase, at the interface of which an effective concentration of free hydrogen ions is made available to bring about the desired gum inhibiting action in the stored liquid hydrocarbons.

Other and further important objects of this invention will become apparent from the following description and appended claims.

In the preferred embodiment of my invention, a layer of water, glycerine or a water soluble glycol is established under the body of liquid hydrocarbon in a storage receptacle. For obvious economic reasons, water is preferred to glycerine or any of the water soluble glycols. The depth of the non-miscible layer so formed is relatively unimportant and may be as little as only a few inches even in tanks of many thousands of gallons capacity. The action that leads to the inhibiting effect is believed to take place at the interface between the non-miscible layer and the liquid hydrocarbons, the natural phenomena of diffusion by reason of intermolecular movement and of circulation by thermal convection currents being relied upon to bring all portions of the liquid hydrocarbons into contact with the immiscible phase at the interface.

In order to increase the surface area at the interface between the non-miscible phase and the liquid hydrocarbons, layers or masses of such non-miscible phase may be suspended at one or more elevations within the storage receptacle. This may be accomplished by the provision of shelves or trays for containing the non-miscible phase. It is also within the scope of my invention to employ cells for containing the non-miscible phase that have pores or liquid permeable walls through which contact can be established between the non-miscible phase and the liquid hydrocarbons. Silica gel, or other solid or semi-solid material capable of being impregnated with water soluble acidifying agents may be employed in this connection.

In the non-miscible phase there is incorporated an acidifying agent that is relatively insoluble in the hydrocarbon liquid but that is water soluble and capable, in aqueous solution, of affording free hydrogen ions. It is satisfactory if the non-miscible layer or phase develops a hydrogen ion concentration equivalent to a pH value of about 6.5 or less numerically.

The following acidifying agents, which are water soluble but relatively insoluble in the liquid hydrocarbons, have been found suitable for use in accordance with the method of this invention:

Boric acid, phosphoric acid, sulfonic acid, water soluble acid metals salts like sodium bisulphate, monosodium phosphate; water soluble organic acids, such as acetic, citric, salicylic, propionic, hydroxy propionic, lactic, saccharic, formic, malic, malonic, maleic, tartaric, succinic and various acidic compounds which can form water soluble salts. One may also use salts of a strong acid and a weak base which hydrolize in a water solution to give a pH value less than about 6.5, such as, for example, aluminum sulfate or ammonium chloride.

The following examples will serve to illustrate the principles of my invention, but it will be understood that these are merely by way of illustrating preferred embodiments of the invention and not as limiting the scope thereof:

Example No. 1

A water layer is deliberately established in the storage tank. Sufficient dry boric acid is added to the water to form a saturated boric acid solution and leave an excess of boric acid for any water that may later accumulate. For every 10 lbs. of water about 0.5 lb. of boric acid might thus be added, but as little as 0.1 lb. would be immediately sufficient. The pH of the resulting boric acid solution is in the neighborhood of 5.6. An uninhibited hydrocarbon motor fuel may be stored over the thus treated water layer for as long a period as six months without a detrimental amount of gum forming in the fuel. Without the treated water layer being present, an excessive and detrimental amount of gum forms in the fuel. From time to time fuel may be withdrawn from the tank and replaced by a new lot of freshly made fuel without disturbing or renewing the treated water layer, and formation of gum will continue to be inhibited in the new lot of fuel.

Example No. 2

With the same conditions as recited in Example No. 1, in place of boric acid about 0.05 lb. of ortho-phosphoric acid may be added for each 10 lbs. of water layer.

Example No. 3

With the same conditions as recited in Example No. 1, about 2 lbs. of lactic acid may be added for each 10 lbs. of water layer.

Example No. 4

With the same conditions as recited in Example No. 1, about 0.5 lb. of mono sodium phosphate may be added for each 10 lbs. of water layer.

Other acids or acid reacting substances may be similarly used in amounts sufficient to produce a water solution having a pH equal to or numerically less than about 6.5. A sufficient concentration of hydrogen ions is established to act catalytically only and without substantial depletion or destruction, as by generation of hydrogen, to inhibit gum formation in the stored uninhibited hydrocarbon motor fuel. Since the acidic reacting substances are relatively insoluble in the hydrocarbon motor fuel, an excess added to the water layer is not of itself harmful to the fuel, and no particular care need be taken in guarding against the use of an excess of the acidic substance.

An uninhibited gasoline was stored under the method of this invention for a period of six months, and, at the end of said six months' period, was subjected to the standard test for pre-formed gum content. The pre-formed gum content was found to be 4.0 mg. per 100 cc. At the same time another sample of the same gasoline, but treated with a fuel soluble gum-inhibitor compound in the form of benzyl para-amino phenol, was stored for a like period of six months, but not under the method of this invention. At the end of six months the sample of gasoline inhibited with benzyl para-amino phenol was tested and found to have a pre-formed gum content of 20 mg. per 100 cc.

It is obvious that the method of my invention greatly reduces the cost of inhibiting gum formation in hydrocarbon motor fuels, as compared with the cost of treating motor fuels with inhibitor compounds which are soluble in the fuel and which are burned with each lot of fuel.

I am aware that numerous details of the process may be varied through a wide range without departing from the principles of this invention, and I, therefore, do not purpose limiting the patent granted hereon otherwise than necessitated by the prior art.

I claim as my invention:

1. In the process of storing an uninhibited liquid hydrocarbon motor fuel having a tendency toward gum formation, the step of inhibiting such gum formation which comprises establishing in contact with a layer of such hydrocarbon motor fuel a relatively fuel-immiscible but water-miscible solution layer containing an acidic substance dissolved therein that is relatively insoluble in said motor fuel and that furnishes at the interface between said layers a persistent concentration of stable hydrogen ions sufficient in amount to act catalytically only and without appreciable depletion in the performance of their function to inhibit gum formation in said stored liquid hydrocarbon motor fuel.

2. In the process of storing an uninhibited liquid hydrocarbon motor fuel having a tendency toward gum formation, the step of inhibiting such gum formation which comprises establishing in contact with a layer of such hydrocarbon motor fuel a relatively immiscible aqueous layer containing a gasoline-insoluble acid reacting substance that furnishes at the interface between said layers a sufficient concentration of hydrogen ions to act catalytically only and without substantial depletion to inhibit gum formation in said stored liquid hydrocarbon motor fuel.

3. In the process of storing an uninhibited gasoline type motor fuel having a tendency toward gum formation, the step of inhibiting such gum formation which comprises establishing in contact with a layer of such motor fuel a relatively immiscible layer consisting of an aqueous solution of a relatively gasoline-insoluble acidic compound that solely by virtue of ionic dissociation in said aqueous solution maintains at the interface between said layers without hydrogen ion destruction, as by liberation of hydrogen, a concentration of stable hydrogen ions sufficient in amount to inhibit gum formation in said stored motor fuel.

4. In the process as defined in claim 3, the step therein set forth in which the relatively gasoline-insoluble acidic compound is boric acid.

5. In the process of storing an uninhibited liquid hydrocarbon motor fuel having a tendency toward gum formation, the step of inhibiting such gum formation which comprises establishing in contact with a layer of such hydrocabron motor fuel a relatively immiscible aqueous boric acid layer that furnishes at the interface between said layers a sufficient concentration of hydrogen ions to act without substantial depletion to inhibit gum formation in said stored liquid hydrocarbon motor fuel.

6. In the process of storing an uninhibited liquid hydrocarbon motor fuel having a tendency toward gum formation, the step of inhibiting such gum formation which comprises establishing in contact with a layer of such hydrocarbon motor fuel a relatively immiscible aqueous lactic acid layer that furnishes at the interface between said layers a sufficient concentration of hydrogen ions to act without substantial depletion to inhibit gum formation in said stored liquid hydrocarbon motor fuel.

7. In the process of storing an uninhibited liquid hydrocarbon motor fuel having a tendency toward gum formation, the step of inhibiting such gum formation which comprises establishing in contact with a layer of such hydrocarbon motor fuel a relatively immiscible aqueous monosodium phosphate layer that furnishes at the interface between said layers a sufficient concentration of hydrogen ions to act without substantial depletion to inhibit gum formation in said stored liquid hydrocarbon motor fuel.

WILLARD E. LYONS.